United States Patent [19]

Beisswenger et al.

[11] Patent Number: 4,546,232
[45] Date of Patent: Oct. 8, 1985

[54] METHOD FOR THE TOPICALLY PRECISE SUBSEQUENT ENGRAVING OF PRINTING CYLINDERS

[75] Inventors: Siegfried Beisswenger; Wolfgang Boppel, both of Preetz, Fed. Rep. of Germany

[73] Assignee: Ing. Rudolf Hell GmbH, Fed. Rep. of Germany

[21] Appl. No.: 548,519

[22] Filed: Nov. 3, 1983

[30] Foreign Application Priority Data

Nov. 4, 1982 [DE] Fed. Rep. of Germany ....... 3240654

[51] Int. Cl.⁴ .............................................. B23K 15/00
[52] U.S. Cl. ........................ 219/121 EJ; 219/121 EW; 219/121 EY; 219/121 EK
[58] Field of Search ................. 219/121 EK, 121 EJ, 219/121 EU, 121 EV, 121 EW, 121 EX, 121 EY, 121 EP, 121 EB, 121 EM; 250/310, 492.2, 491.1

[56] References Cited

U.S. PATENT DOCUMENTS 3,404,254 11/1968 Jones .............................. 219/121 EJ
4,393,295 7/1983 Beisswenger et al. .............. 219/121

FOREIGN PATENT DOCUMENTS

2361903 7/1975 Fed. Rep. of Germany .
2513042 9/1976 Fed. Rep. of Germany .

Primary Examiner—C. L. Albritton
Attorney, Agent, or Firm—Hill, Van Santen, Steadman & Simpson

[57] ABSTRACT

A method for the topically precise subsequent-engraving of printing cylinders wherein special marks are engraved in the cylinder and evaluated. The marks are engraved in the form of cups forming a cup track. The cups serve as reference marks for an axial feed and start of the subsequent-engraving in a circumferential direction. After the printing cylinder has been mounted in an engraving machine for subsequent-engraving, the cylinder is placed in rotation and the scanner is moved over the previously engraved cup track axially. A maximum of the signals received from the scanner is identified and a location of the maximum in the cup track is retained as a reference value for the axial feed during the following engraving. A cup track is provided with at least one defined gap that is free of cups. A first cup following the gap is identified by means of the scanner and evaluated as a reference location for a start of engraving in the circumferential direction for the following subsequent-engraving.

7 Claims, 19 Drawing Figures

Fig. 5b sensor signals for axial phasing

Fig. 6 circumferential phasing

Fig. 7

Fig. 9 maximum detector

METHOD FOR THE TOPICALLY PRECISE SUBSEQUENT ENGRAVING OF PRINTING CYLINDERS

BACKGROUND OF THE INVENTION

The present invention relates to a method for the topically precise subsequent-engraving of printing cylinders.

It has already, been disclosed in German Patent 23 61 903 which corresponds to U.S. Pat. No. 3,997,838 and in German Patent 25 13 042 which corresponds to U.S Pat. No. 4,057,838, both incorporated herein by reference, that parts of masters can be subsequently engraved with precise registration at very specific locations of the circumference of a printing form on a form cylinder that has already been partially engraved. This problem arises in magazine printing when, for example, a magazine page contains an advertising portion and a current portion. The advertising portion is engraved and proofed long before the magazine is issued in order to be able to submit a proof to the customer for quality control. The current portion is then subsequent-engraved shortly before the magazine is finished. It is important that the subsequent-engraving on all printing cylinders of a set of color plates is positioned with precise registration relative to the initial engraving.

Solutions have been described in the two cited patents for electro-mechanical engraving wherein an angular offset between the scanning cylinder and the engraving cylinder is measured by means of stationary reference marks on the scanning and engraving cylinders. One of these reference marks is often referred to as the north pulse because it only appears once on the circumference of the printing cylinder, and pulses are blanked out or inserted by the voltage of the drive motor for the engraving cylinder until the angular offset becomes zero. For this purpose, a raster disc connected to the printing cylinder is photo-electrically scanned and a circumference pulse—also referred to as a north pulse—is generated upon every revolution of the cylinder. The raster disc also supplies a multitude of pulses with which an engraving clock is generated and synchronized by means of a PLL circuit.

This procedure is not possible in electron beam engraving of printing cylinders because there is no scanning cylinder that rotates synchronously with the printing cylinder since the engraving is operated offline to the scanning, i.e. from a memory. As a consequence, an angular offset to the scanning cylinder that could be evaluated as a criterion for the re-phase-in cannot be identified.

SUMMARY OF THE INVENTION

It is an object of the present invention to specify a method which, independently of the scanning event, enables the engraving event in a subsequent-engraving to be started with topical precision at a prescribed location on the surface of the engraving cylinder. According to the invention, a series of successively disposed cups or the like are engraved on a circumferential line of an as yet unengraved printing form associated with the printing cylinder to form a cup track before an actual engraving. The cups serve as reference marks for an axial feed and start of the subsequent-engraving in a circumferential direction. After the printing cylinder has been mounted in the engraving machine for subsequent-engraving, the printing cylinder is placed in rotation and a scanner is moved over the previously engraved cup track axially relative to the printing cylinder. A maximum of the signals received from the scanner is identified and a location of the maximum in the cup track is retained as a reference value for the axial feed during the following engraving. The series of cups previously engraved on the circumferential line is provided with at least one defined gap that is free of cups. A first cup is identified following the gap by means of a scanner and is evaluated as a reference location for a start of the engraving in the circumferential direction for the following subsequent-engraving.

BRIEF DESCRIPTION OF THE DRAWINGS

FIG. 7 is a pulse diagram for evaluation of individual pulses for phasing-in;

FIG. 14 is a flow chart for a program sequence for approach to a starting position during phasing-in;

DESCRIPTION OF THE PREFERRED EMBODIMENTS

Figure 1:
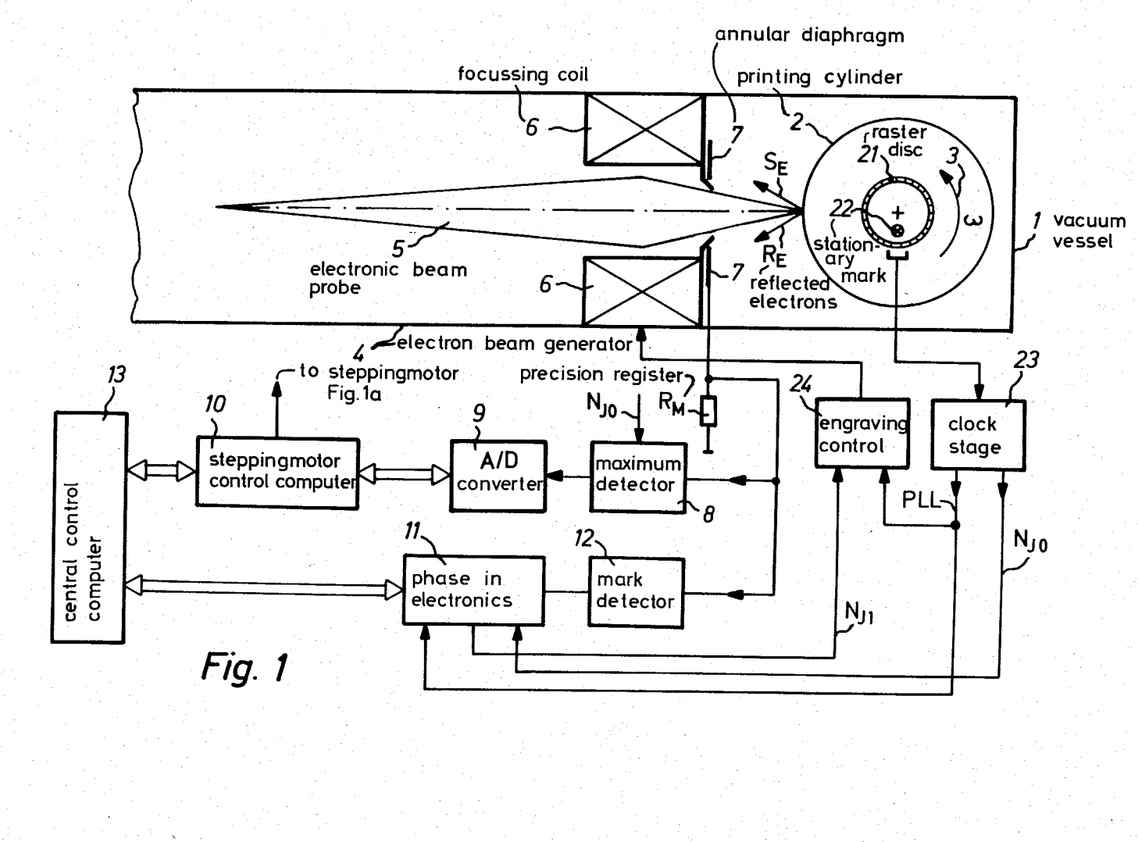
FIG. 1 is a schematic illustration of an apparatus for implementation of a method according to the invention.

In section, FIG. 1 shows an apparatus for electron beam engraving of printing cylinders and which comprises a vacuum vessel 1 in which a printing cylinder 2 is situated, said cylinder 2 being placed in rotation in an arrow direction 3 with the angular velocity $\omega$ by a drive (not illustrated). An electron beam generator (likewise schematically illustrated) in which an electron beam probe 5 is generated follows the vacuum-tight housing 1.

Engraving machines are known wherein the relative axial movement between the printing cylinder and the engraving system is achieved by means of axial displacement of either the printing cylinder or of the engraving system. The present invention can be advantageously applied to both operating modes.

The electron-optical structure of the electron beam generator 4 has been omitted and only the focussing coil 6 has been shown, the electron beam being focussed on the surface of the printing form with the coil 6.

The engraved cups are produced by means of focussing and defocussing. The drive of the focussing coil 6 occurs according to German Patent 29 47 444 which corresponds to U.S. Pat. No. 4,393,295, incorporated herein by reference. The engraving control is not explained in detail here since the present case is primarily concerned with the generation of the pulses with which the engraving is started in the axial and in the circumferential direction. In order to acquire these pulses, the electron beam generator is switched to the measuring mode before the actual engraving. This is explained in detail later. Secondary electrons SE proceeding from the surface of the printing form and reflected electrons RE proceed to an annular diaphragm 7 which is grounded via a precision resistor $R_M$. The sensor signal supplied by the diaphragm 7 is forwarded to a maximum detector 8 from which it is supplied to the stepping motor control 10 after an analog-to-digital conversion in an analog-to-digital converter 9. A phase-in electronics 11 is also provided and is connected via a mark detector 12 to the diaphragm 7. The electronics 11 receives so-called north pulses $N_{jo}$ from a stationary mark 22 from a raster disc 21 that rotates synchronously with the printing cylinder 2. The phase-in electronics 11 is also connected to a stage 23 for clock generation that supplies the frequencies for the engraving control 24. The phase-in electronics, like the stepping motor control 10 as well, is connected to a central control computer 13 and supplies the pulses required for phasing-in at its output.

Figure 1A:
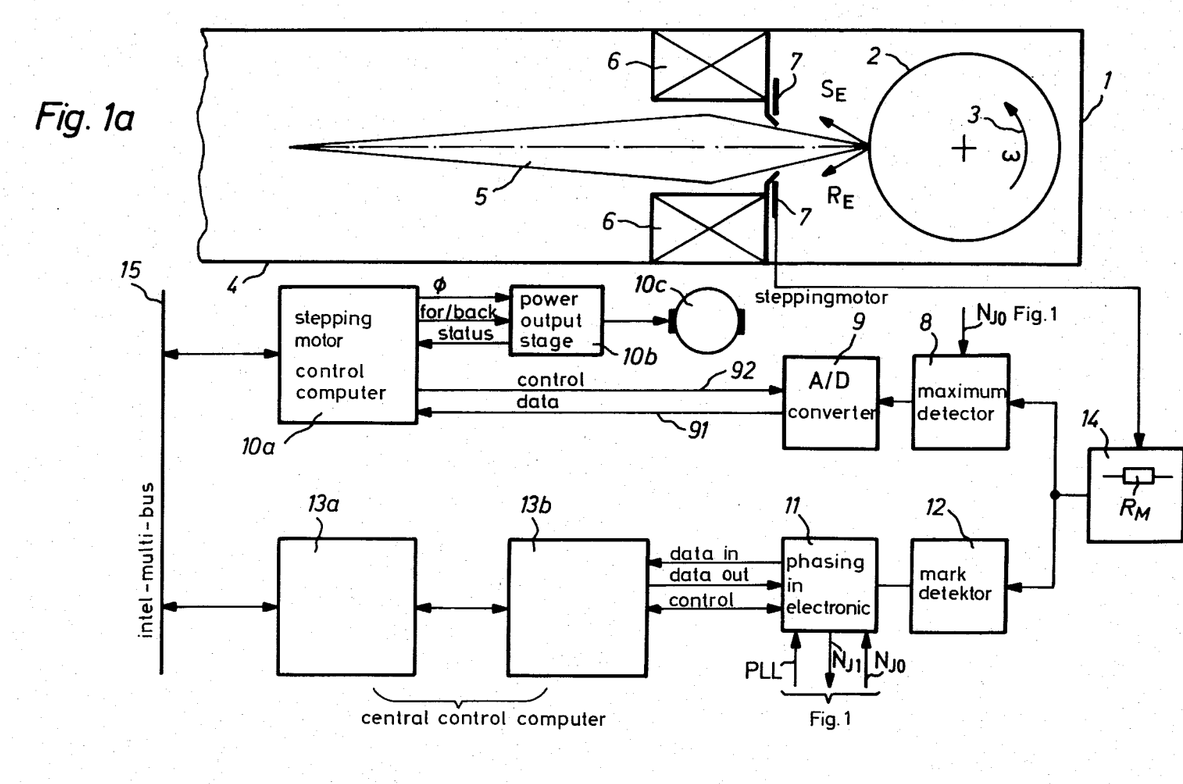
FIG. 1a is a more detailed block diagram according to FIG. 1.

FIG. 1a shows fundamentally the same structure as FIG. 1, but the circuit is more precisely divided into its individual components. The stepping motor control 10 of FIG. 1 comprises a stepping motor control computer 10a of, for example, the type i SBC 80/24 of the Intel Company having 80 programmable input/output lines, and further comprises a stepping motor power output stage 10b, Type CD 30 of the Phytron Company, Munich. The type ZSH 125-200-15 of the Phytron Company, Munich, can, for example, be employed as the stepping motor 10c.

The stepping motor power output stage 10b is connected to the motor control computer 10a over a clock line $\phi$, a forward/backward control line, and a status line. The motor control computer 10a is in communication with the analog-to-digital converter 9 over a data line 91(which can, for example, be a 12-fold line) and over a control line 92. The precision resistor $R_M$ of FIG. 1 is designed as a current-voltage transformer 14 in FIG. 1a, and is described in greater detail in FIG. 8. The central control computer 13 comprising modules 13a (type i SBC 86/12A) and programmable interface 13b (type i SBC 519 of the Intel Company) is connected to the stepping motor control computer 10a over a data bus 15 (Intel-Multi-Bus IEEE 796). The technical details of the individual assemblies shall be explained in greater detail below with reference to FIGS. 8–11.

Figures 2, 3:
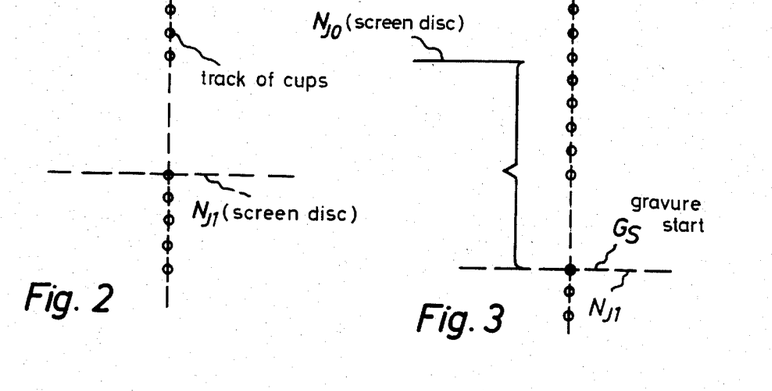
FIG. 2 is an illustration of an engraved cup track.
FIG. 3 is an illustration of a topical allocation of a cup track in a non-phased-in condition.

FIG. 2 shows a cup track as is applied, for example to the edge of the cylinder at the beginning of the engraving. This cup track can also lie on a circumferential line that is not engraved at the edge of the printing form but, rather, next to the printing form or at a location on the printing form where it does not disturb the image content or the printing. an as yet unengraved cylinder is provided with such a cup pattern before each engraving. A few cups are omitted in the cup pattern in front of the north pulse. The location of the start of engraving is thus defined in the feed direction and in the circumferential direction.

In an after-engraving process, for example when producing department store catalogs wherein the prices are subsequently engraved, the north pulse $N_{jo}$ of the raster disc and the start of engraving $G_S$ can be displaced relative to one another after the cylinder has been mounted in the engraving machine, this being schematically illustrated in FIG. 3. In this FIG. $N_{jo}$ denotes the north pulse of the raster disc and $G_S$ denotes the start of engraving on the cylinder.

For phasing-in, the electron beam—as already mentioned—is operated as a measuring probe, i,e. it is operated at a lower intensity in comparison to its intensity in the material processing. Its diameter in comparison to the diameter of the cup is reduced to such a degree as is required by the positioning precision when phasing-in (resolution of the cup by the electron beam). For example, the beam spot is set to 5 $\mu$m diameter and the power density is set to $10^4$ watts/cm$^2$ for this purpose.

Figure 4:
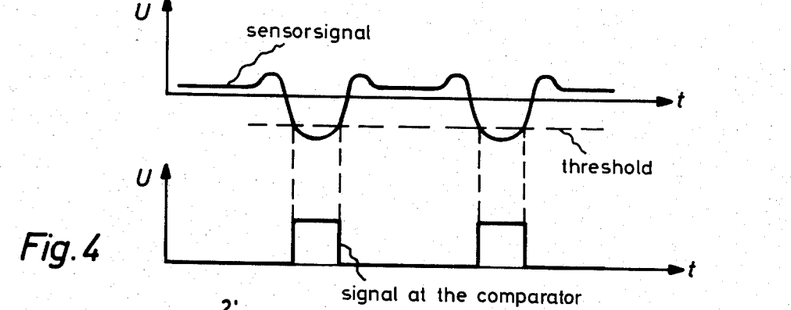
FIG. 4 is a diagram for evaluation of sensor signals.

At its upper portion, FIG. 4 shows the curve of the signal at the output of the current-voltage transformer 14. One can see that a symmetrical signal having two approximately equal maximums is generated at each cup. The symmetry of this signal derives, on the one hand, from the fact that the cup is likewise symmetrical and, on the other hand, since the measuring diaphragm 7 symmetrically surrounds the electron beam 15. It results therefrom that the electron beam probe generates an identical signal at the walls of the cup upon entry of the cup into the beam and upon departure from the beam.

This double signal is evaluated with the assistance of a comparator to be described later with reference to FIG. 12, and the signal shown as a rectangular signal in FIG. 4 is obtained, this signal being evaluated for the phase-in operation in the circumferential direction as explained later.

Figure 5A:
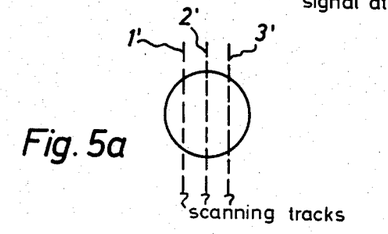
FIGS. 5a and 5b are an example of sensor signals for phasing-in in an axial direction.
Figure 5B:
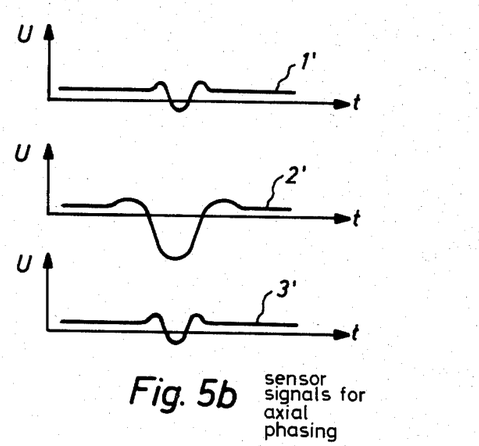

FIG. 5a shows three scanning tracks through a cup and FIG. 5b shows the signal progression for three scanning tracks for that case in which the axial zero position of the cylinder is to be identified. The signal progressions 1', 2' and 3' in FIG. 5b derive for the three tracks, said signal progressions being interpreted by means of the maximum detector 8 of FIG. 1. The maximum signal is encountered in the second track, i.e. in the central range of the cup, this also being confirmed by the curve progression 2'. During the phase-in operation in the axial direction, the counter reading at which the measured value at the output of the current-voltage transformer 14 produces a maximum is sought.

The positioning of the engraving in the subsequent-engraving process now ensues relative to this counter reading.

These operations shall be explained later with reference to FIGS. 12 through 16.

Figure 6:
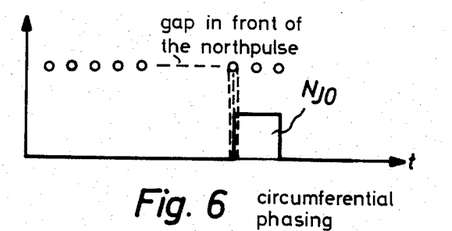
FIG. 6 is a cup track with gaps for phasing-in in a circumferential direction.

As already presented in FIG. 4, the diaphragm 7 supplies a signal whose rising and falling edges correspond to the cup edges of the engraving cup. FIG. 6 shows the cup track with a gap in front of the north pulse $N_{Jo}$. During phase-in, the number of PLL clocks emitted by the clock generator from on the one hand the north pulse $N_{jo}$ of the raster disc up to the rising pulse edge of the first cup appearing after the gap, and from on the other hand the north pulse $N_{jo}$ of the raster disc up to the falling edge of the measuring signal, are counted. This is shown in detail in FIG. 7. Let the number of pulses up to the rising edge be $z_1$ and let the number of pulses up to the falling edge be $z_2$, whereby $z_2 > z_1$ applies. As presented in FIG. 7, the phased-in north pulse is obtained since, proceeding from the north pulse of the raster disc, the number $z = \frac{1}{2}(z_1 + z_2)$ of PLL clocks is counted, whereupon the actual north pulse $N_{j1}$ is electronically generated. This pulse, i.e. the corresponding counter reading, is stored and serves as a new reference for the subsequent engraving in the circumferential direction. The acquisition of this pulse by means of the individual circuit components is presented in greater detail in FIG. 10a, and FIG. 10a shall be explained in greater detail in the course of the description to FIGS. 8–11.

Figures 8, 10:
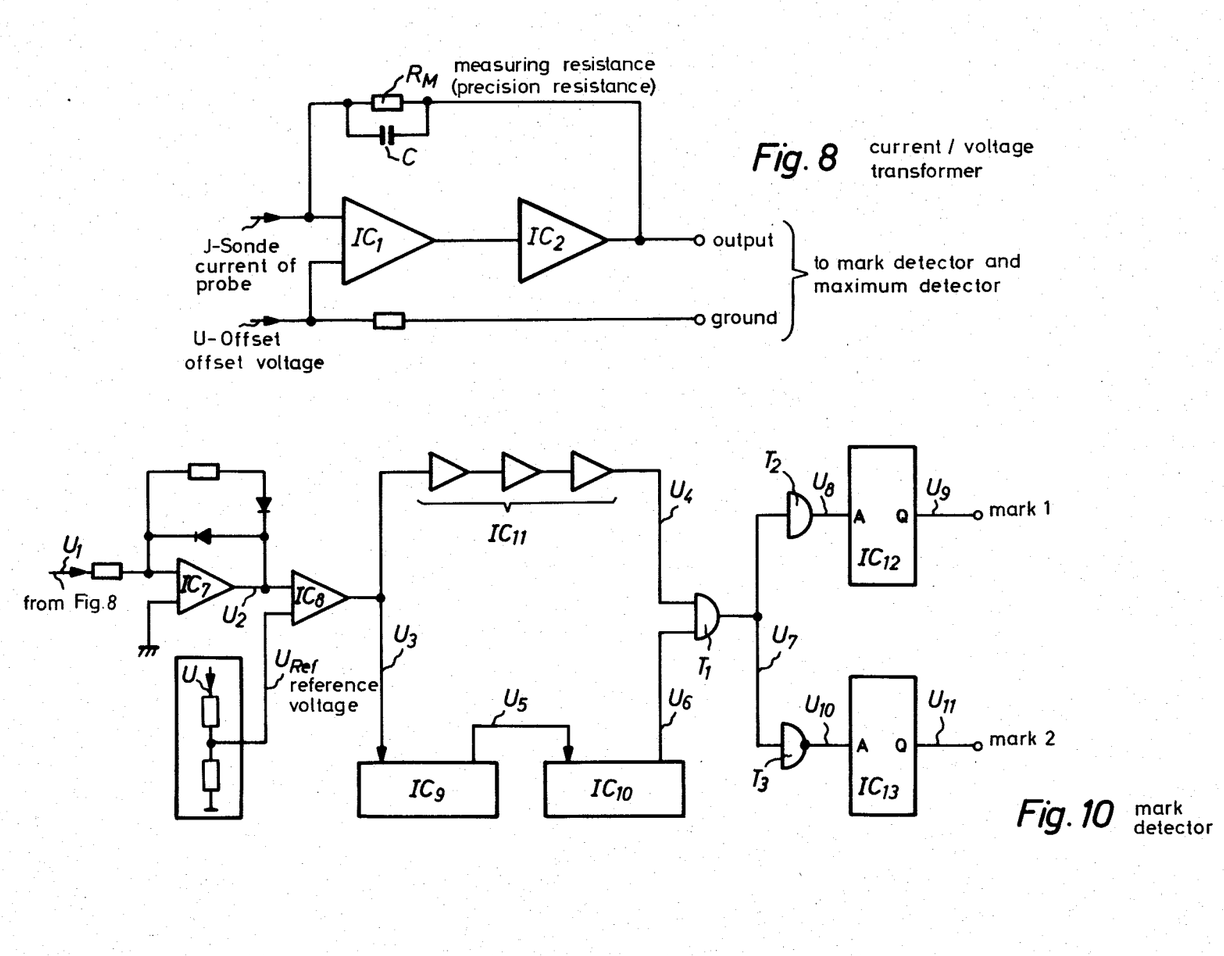
FIG. 8 is a sample embodiment of a circuit for realization of the "precision resistor"
FIG. 10 is a circuit of a mark detector.

FIG. 8 shows the current/voltage transformer 14 of FIG. 1a in detail. The testing current of the diaphragm 7 of FIG. 1 or, respectively, FIG. 1a arrives at two series-connected integrated circuits $IC_1$ and $IC_2$ which are wired according to FIG. 8. The type ADLH 32 is preferably employed for the circuits $IC_1$ and the type ADLH 33 for the circuit $IC_2$, both of the Analog Devices company. The function of this circuit is explained in greater detail below.

The actual precision resistor $R_M$ lies in the feedback branch between the output and input of the series connection consisting of $IC_1$ and $IC_2$. $IC_1$ and $IC_2$ function in known manner as a current/voltage transformer having a very low input resistance. A smaller time constant in comparison to the measuring circuit illustrated in FIG. 1 is thus obtained.

Figure 10A:
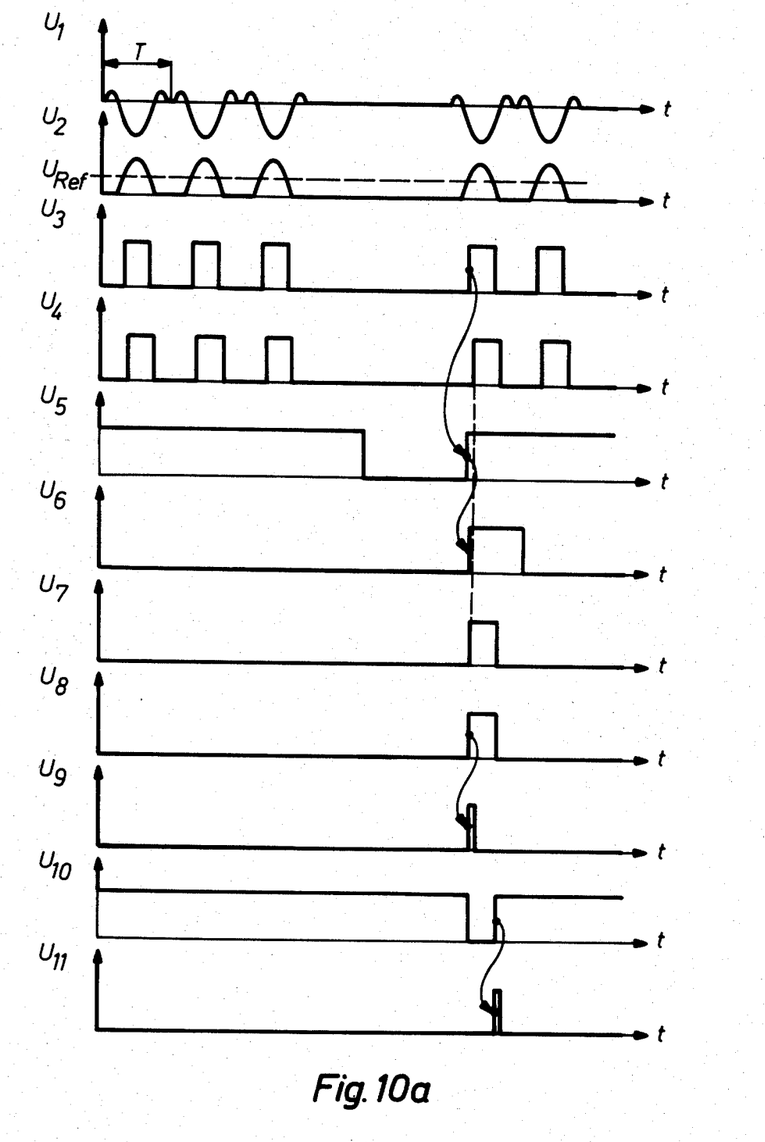
FIG. 10a is a detailed pulse diagram relating to FIG. 10.

The output of the stage $IC_2$ is connected to the mark detector 12 and to the maximum detector 8 of FIG. 1 or, respectively, FIG. 1a and supplies an output voltage $U_1$ as illustrated in FIG. 10a.

Figure 9:
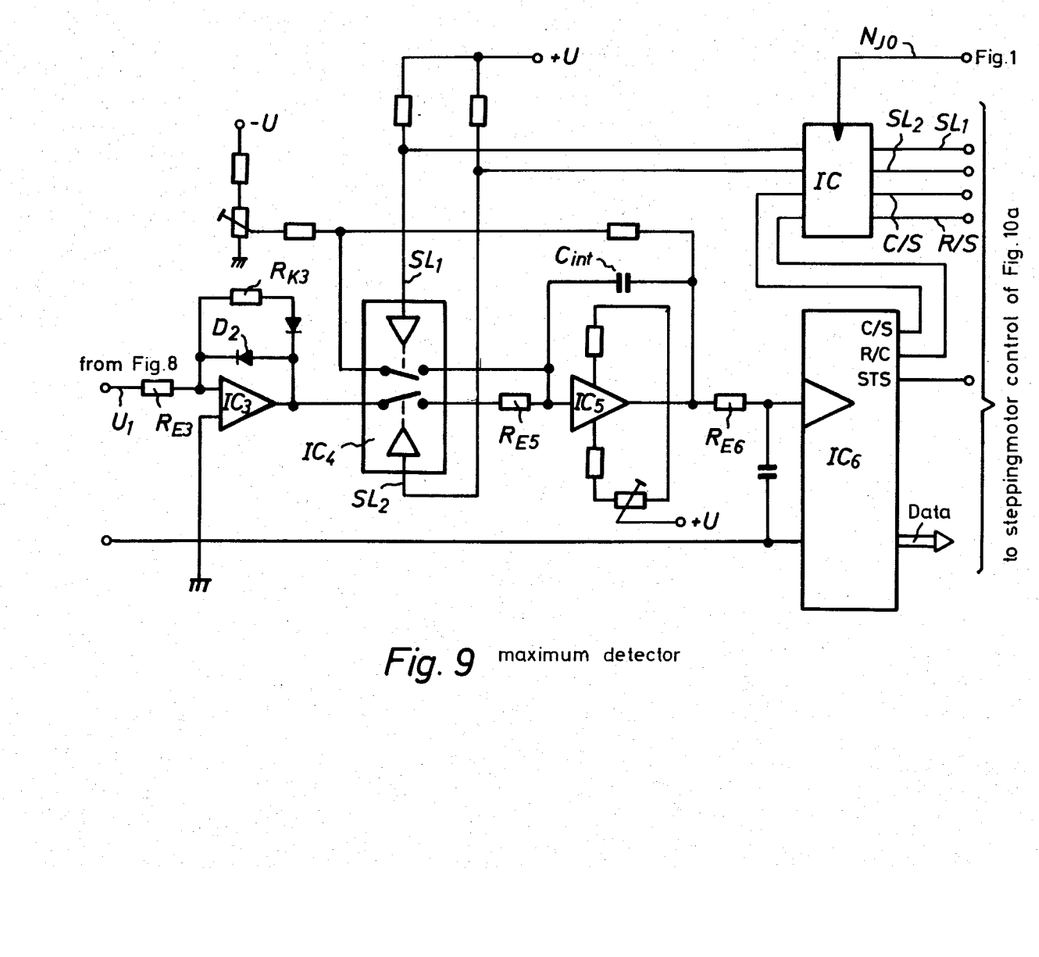
FIG. 9 is an exemplary circuit for a maximum detector.

The circuit of the maximum detector 12 is illustrated in greater detail in FIG. 9. The voltage $U_1$ is amplified and rectified in a first amplifier $IC_3$. For this purpose, the diodes $D_1$ and $D_2$ lie in the feedback branch of $IC_3$, whereby the diode $D_1$ lies in series with the feedback resistor $R_{K3}$ and diode $D_2$ lies in non-conducting direction over the series connection consisting of the feedback resistor $R_{K3}$ and $D_1$. The rectified voltage is present at the input of an integration and hold stage consisting of the commercially available electronic components $IC_4$ and $IC_5$. The integration results is forwarded to an analog-to-digital converter $IC_6$ which can likewise be designed as an integrated circuit. As already mentioned, the circuit of FIG. 9 can be constructed of commercially available components, whereby, for example, the type ADLH 32 of the Analog Devices company can be employed for the module $IC_3$, the type DG 300 of the Silonix company can be employed for the module $IC_4$, the type OP 16 of the PMI company can be employed for the module $IC_5$, and the type AD 574 of the Analog Devices company can be employed for the module $IC_6$.

The integration stage $IC_4$ has control outputs $SL_1$ and $SL_2$ over which the functions integrate, hold and reset can be selected. These lines are connected to the stepping motor control computer 10a for the stepping motor. The functions integrate, hold, and reset are selected with the assistance of the MOS switch $IC_4$, occurring in accordance with the following truth table:

|  | $SL_1$ | $SL_2$ |
| --- | --- | --- |
| Integrate | L | H |
| Hold | H | L |
| Reset | H | H |

FIG. 10 shows the mark detector 12 of FIGS. 1 and 1a. The output signal of the current/voltage transformer 14 which is described in detail in FIG. 8 proceeds as an input signal $U_1$ to a rectifier stage $IC_7$ that is constructed like the rectifier stage $IC_3$ of FIG. 9. The rectified output signal $U_2$ of this stage is compared to a reference voltage $U_{Ref}$ in a comparator $IC_8$ in order to obtain a digital output signal $U_3$. The signals $U_1$, $U_2$, $U_{Ref}$, and $U_3$ are illustrated in FIG. 10a.

In order to detect the first cup after the gap in the reference track (FIG. 2 or FIG. 6), the digital output signal $U_3$ is forwarded to a delay stage $IC_{11}$, the output signal of this stage $IC_{11}$ being referenced $U_4$ in FIG. 10a. The signal $U_3$ is also supplied to an additional monoflop $IC_9$ whose output signal $U_5$ (FIG. 10a) corresponds to the gap. The signal $U_5$ is supplied to a further monoflop $IC_{10}$ whose time constant corresponds to a cup clock. This output signal $U_6$ (FIG. 10a) is forwarded together with the output signal $U_4$ of the delay stage to an AND gate $T_1$ at whose output a signal $U_7$ corresponding to the first cup after the gap in the reference track (FIG. 7c or voltage $U_7$ in FIG. 10a) appears. The signal $U_7$ proceeds, on the one hand, over a transit time compensation element $T_2$ to a monoflop $IC_{12}$ and, on the other hand, over an inverter $T_3$ to a further monoflop $IC_{13}$.

Figure 7:
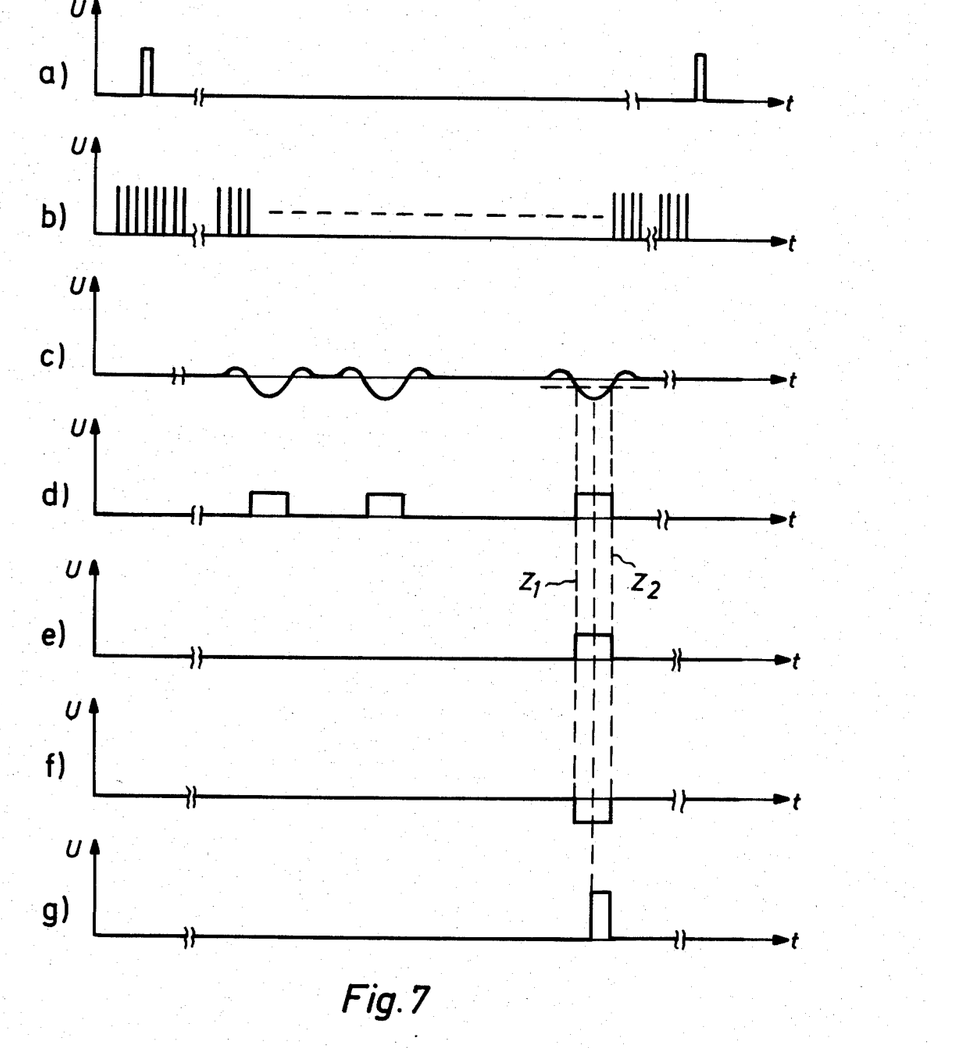

The two monoflops $IC_{12}$ and $IC_{13}$ generate two needle pulses belonging to the edges $Z_1$ and $Z_2$ of FIG. 7, these being referenced as mark 1 and mark 2 and illustrated in FIG. 10a as $U_9$ and $U_{11}$.

The following commercially available components can, for example, be employed for the circuit illustrated in FIG. 10:

| $IC_7$ | OP 16 | PMI |
| --- | --- | --- |
| $IC_8$ | LM 311 | National Semiconductor |
| $IC_9$ | 74 LS 122 | Texas Instruments |
| $IC_{10}$ | 74 LS 121 | Texas Instruments |
| $IC_{11}$ | 74 LS 31 | Texas Instruments |
| $IC_{12}$ | 74 LS 121 | Texas Instruments |
| $IC_{13}$ | 74 LS 121 | Texas Instruments |

Figure 11:
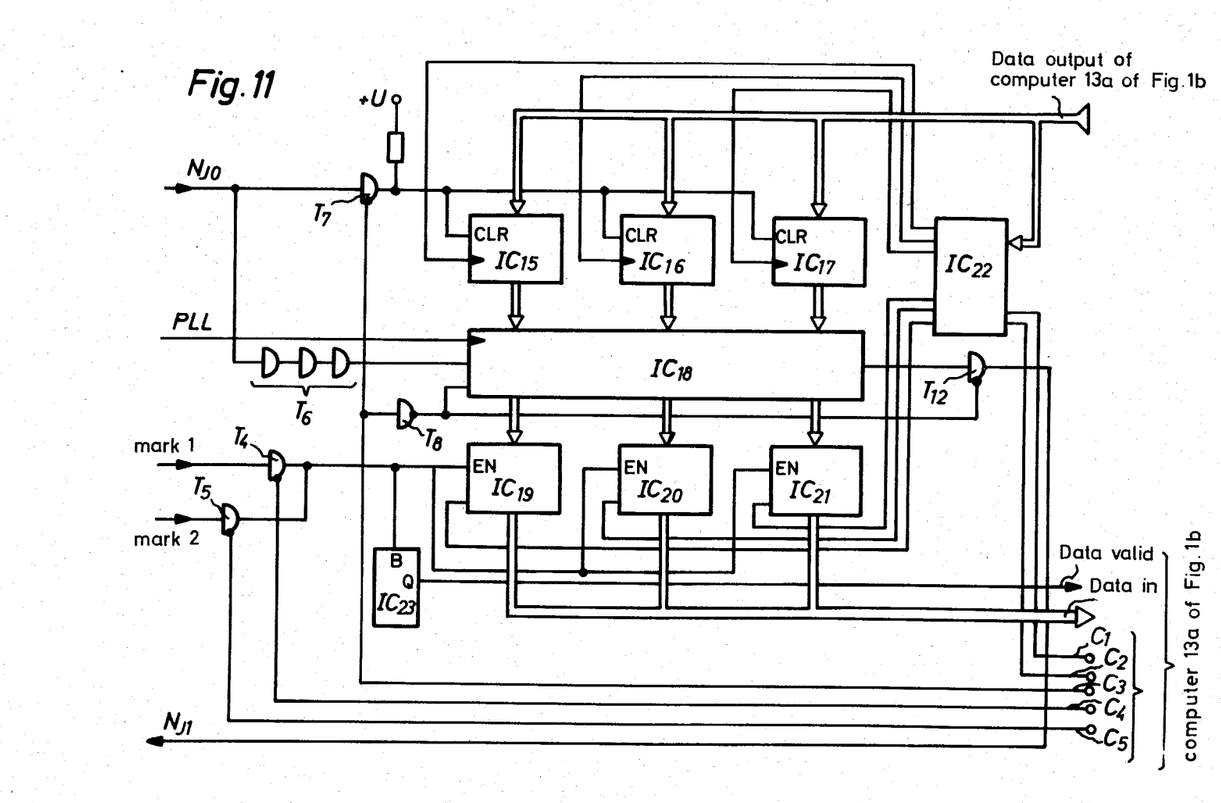
FIG. 11 is a circuit for acquisition of a phased-in north pulse.

FIG. 11 shows a circuit arrangement with whose assistance the north pulse $N_{j1}$ displaced relative to the north pulse $N_{jo}$ of the raster disc (FIG. 2 or FIG. 3) is generated. In order to achieve this, the counter readings $Z_1$ and $Z_2$ are first acquired, these corresponding, on the one hand, to the number of PLL clocks between $N_{jo}$ of the raster disc and the mark 1 and, on the other hand, to the number of PLL clocks between the north pulse $N_{jo}$ and the mark 2.

A loadable 24-bit- counter $IC_{18}$ is provided for this purpose, and is connected to three 8-bit-D-bit registers $IC_{15}$ through $IC_{17}$ as well as to three 8-bit-D-latches. Over a 2-bit binary decoder $IC_{22}$, the registers $IC_{15}$ through $IC_{17}$ can be successively selected by the control computer 13a by means of the control lines $C_1$ and $C_2$ and can be loaded over the data output and readout over the registers $IC_{19}$ through $IC_{21}$.

The acquisition of the counter readings $Z_1$ and $Z_2$ ensues with the assistance of the marks 1 and 2 as well as the counter $IC_{18}$ and the two register groups $IC_{15}$ through $IC_{17}$ and $IC_{19}$ through $IC_{21}$. The counter reading $z_1$ obtained in that a control line $C_3$ which is connected to central computer 13 and to the gates $T_7$, $T_8$, and $T_{12}$ is set at L.

Two further control lines $C_4$ and $C_5$ connected to the computer 13 and gates $T_4$ and $T_5$ determine which of the marks 1 or 2 are allowed to pass by the gates $T_4$ and $T_5$.

For the selection of the mark 1, the control line $C_4$ lies at L and the control line $C_5$ lies at H. At every north pulse, the registers $IC_{15}$ through $IC_{17}$ are set to zero over a gate $T_7$ and, after a delay time determined by a delay element $T_6$, the contents of the registers $IC_{15}$ through $IC_{17}$ are transferred into the counter $IC_{18}$, i.e. $IC_{18}$ is set to zero at every north pulse.

The counter $IC_{18}$ is switched to forward counting by the gate $T_8$ and is incremented by the PLL clocks.

Upon appearance of the mark 1, the content of the counter $IC_{18}$ is transferred into the registers $IC_{19}$ through $IC_{21}$ and is read into the central computer 13 as counter reading $Z_1$ after a delay time that is determined by the monoflop $IC_{21}$.

The counter reading $Z_2$ is analogously acquired with the assistance of the mark 2 in that the control line $C_4$ is set to H and the control line $C_5$ is set to L.

After the counter readings $Z_1$ and $Z_2$ are present in the central computer 13, the mean value Z is calculated in the computer. Subsequently, the control line $C_3$ is set to H by the computer 13. This results in the registers $IC_{15}$ through $IC_{17}$ no longer being set to zero at every north pulse. Rather, the value once inscribed is retained and this value is transferred into the Counter $IC_{18}$ upon the occurrence of every north pulse. Furthermore, the counter $IC_{18}$ is switched to a down counting operation via the inverter $T_8$ and the output signal (carry=ripple carry output) of the counter $IC_{18}$ is allowed to pass over a gate $T_{12}$.

Simultaneously, the mean value Z is likewise loaded from the computer 13 into the registers $IC_{15}$ through $IC_{17}$. At every following north pulse $N_{jo}$, the contents of the registers $IC_{15}$ through $IC_{17}$ are loaded into the counter $IC_{18}$ and are counted off with every PLL clock. As already mentioned, the signal "Carry" is output for a PLL clock length given the counter reading zero. This operation is at every drum revolution.

The following commercially available components can, for example, be employed in the circuit illustrated in FIG. 11:

| | | |
|---|---|---|
| $IC_{15}$ | 74 LS 273 | Texas Instruments |
| $IC_{16}$ | 74 LS 273 | Texas Instruments |
| $IC_{17}$ | 74 LS 273 | Texas Instruments |
| $IC_{18}$ | 6 × 74 669 | Texas Instruments |
| $IC_{19}$ | 74 LS 373 | Texas Instruments |
| $IC_{20}$ | 74 LS 373 | Texas Instruments |
| $IC_{21}$ | 74 LS 373 | Texas Instruments |
| $IC_{22}$ | 74 LS 155 | Texas Instruments |
| $IC_{23}$ | 74 LS 121 | Texas Instruments |

The sequence of the computer control of the installation is described in greater detail below. As already mentioned, the central control computer 13 is connected to the stepping motor control computer 10a over an Intel-Multi-Bus IEEE 796. The specification of this bus is described in the handbook, Intel OE-Systems Handbook 1983, order No. 210941-001, pages 3-1 through 3-10 so that a repetition of this description is omitted here since the bus can be incorporated without modifications.

The central control computer 13 serves as a master computer in the computer control; the stepping motor computer 10a functions as a slave computer. The data are transferred between master and slave in the known handshake method. Instruction codes and parameters such as, for example, "drive the stepping motor into rated position"—whereby "drive the stepping motor" is an instruction and "rated position" is the corresponding parameter—are transmitted to the motor control computer 10a from the central control computer 13.

After execution of an instruction, the stepping motor computer 10a emits a "status report", for example "rated position reached", to the central control computer 13.

Figure 12:
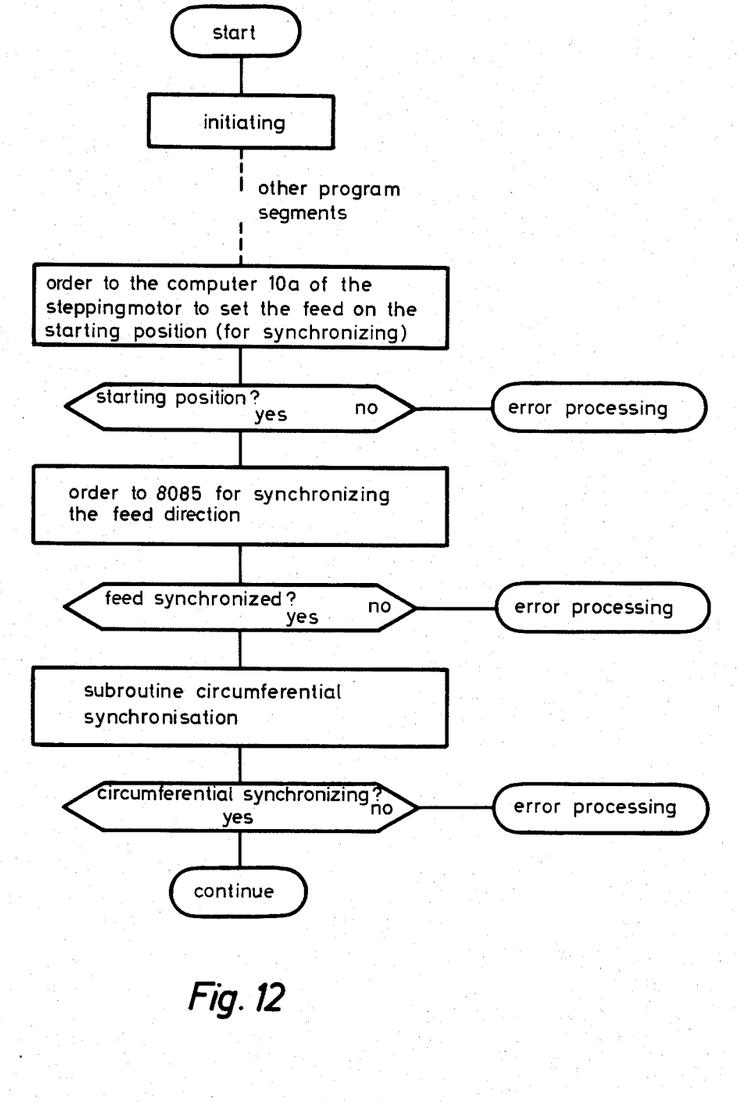
FIG. 12 is a flow chart for a program sequence of a process control computer.

The program sequence of the control computer 13 is disclosed in greater detail in FIG. 12 in the form of a flow chart. Since such a computer is employed not only for the control of the inventive phase-in electronics but also assumes other control tasks, for example control of the electron beam gun or of the overall installation, only those program segments which are of significance to the execution of the invention are described here, namely the program segments:

(1) "Instruction to the stepping motor control computer 10a".

(2) Approaching the start position for the phasing-in-"Instruction to the stepping motor control computer 10a".

(3) Phasing-in in a feed direction and the subprogram "phasing-in in circumferential direction".

Figure 13:
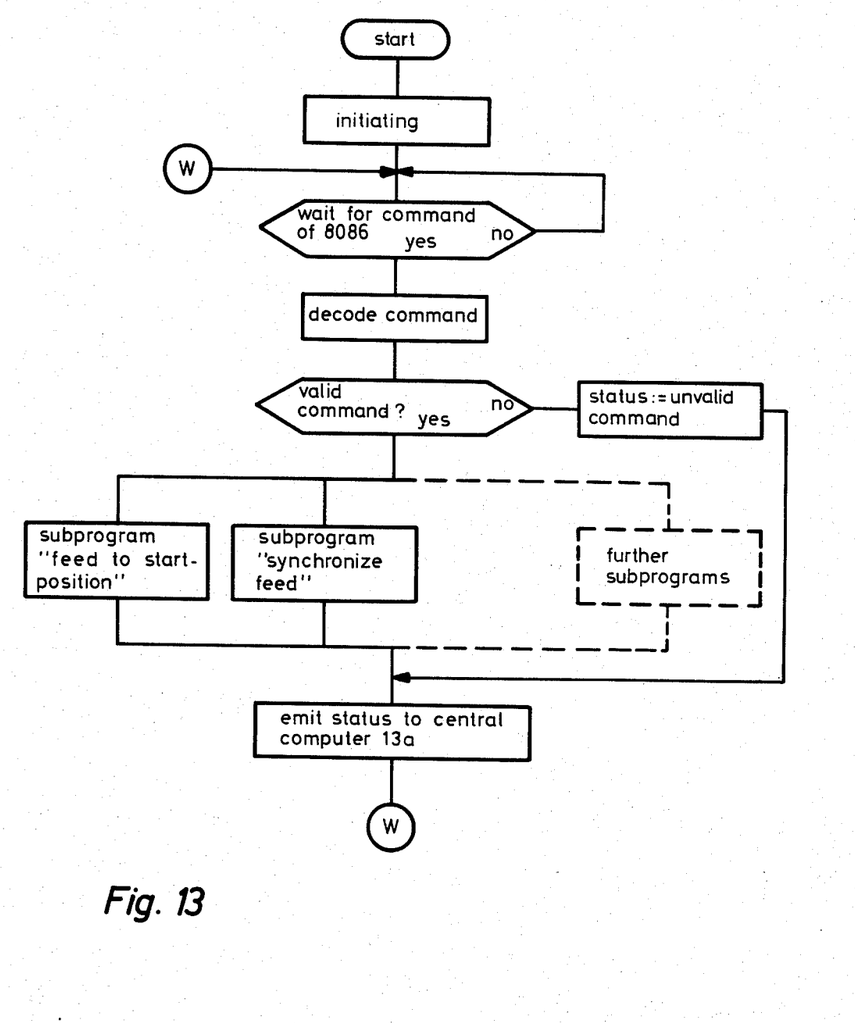
FIG. 13 is a flow chart for a program sequence of a stepping motor computer.

In the form of a further flow chart, FIG. 13 shows the program sequence in the stepping motor control computer 10a, this essentially consisting of the following program segments:

waiting for an instruction from the control computer 13, decoding the instruction, branch to the instruction execute programs explained in yet greater detail later with reference to FIGS. 14–15, status report.

Figure 14:
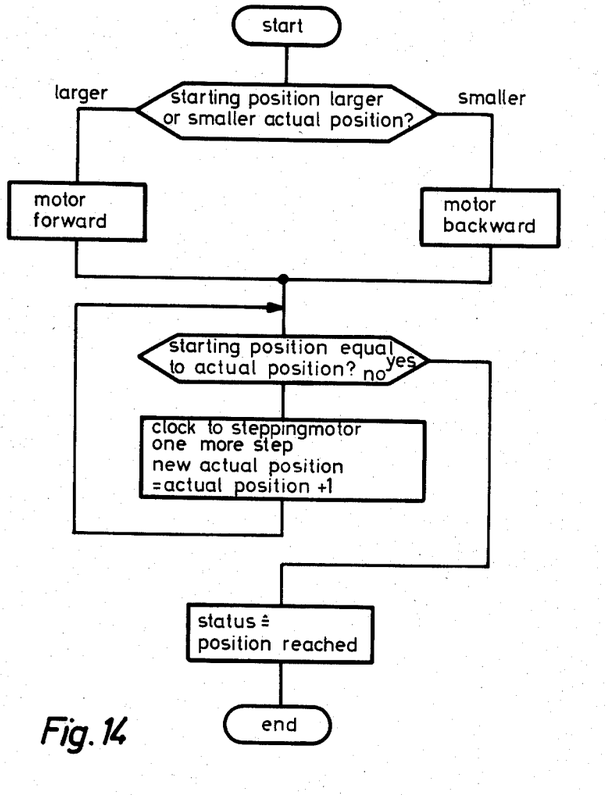

FIG. 14 shows the program "Approaching the starting position for the phase-in" as a flow chart, whereby the following sequence is provided:

interrogation as to whether the motor position is greater or less than the starting position for the phase-in, instruction to the motor advance/return (advance/- return line, FIG. 1a between 10a and 10b), application of the stepping motor clock over line φ(FIG. 1a) to the stepping motor until the rated position is reached, and status report.

Figure 15:
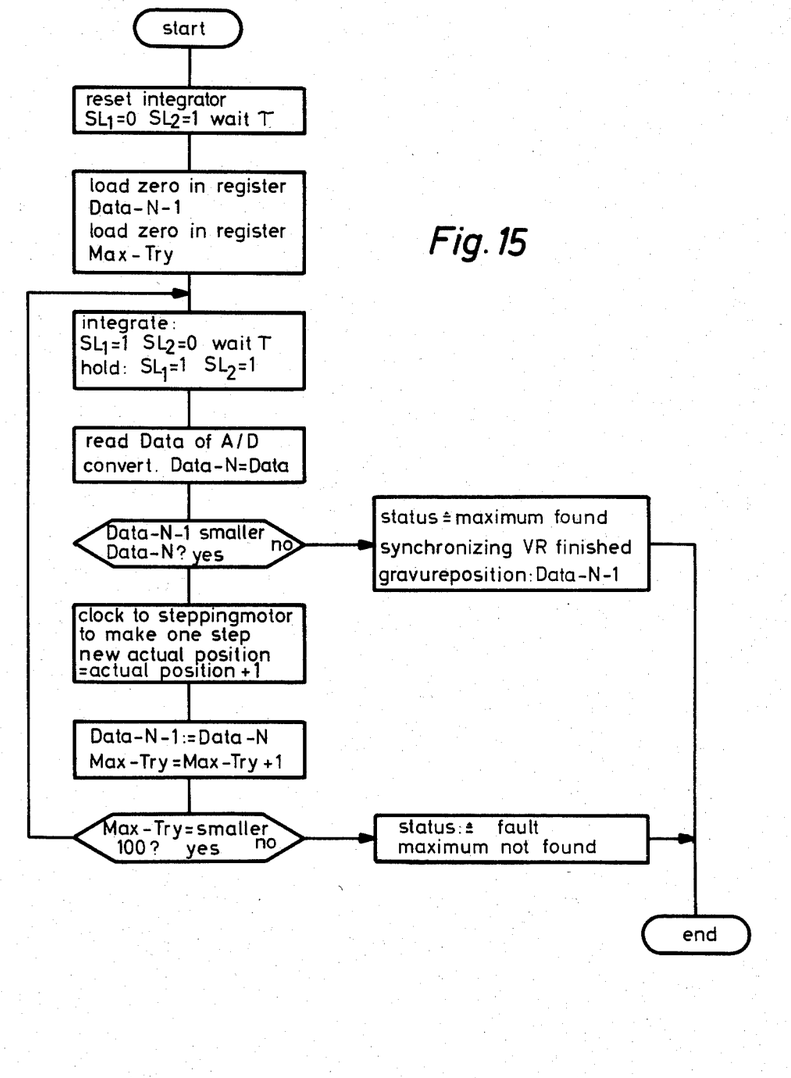
FIG. 15 is a flow chart for a subprogram "phase-in in advance direction"

The subprogram "Phasing-in in feed direction" is described as a flow chart in FIG. 15. The sequence of this program has already been described up to the readout of the analog-to-digital converter $IC_6$ in the description to FIG. 9. See the upper half of FIG. 15.

The further program sequence is presented in the lower part of FIG. 15 and shall be described below in conjunction with FIGS. 5a and 5b.

When one track of FIG. 5a is traversed, for example the first track, then the measured signal of this cup track is retained in integrated fashion, is digitized with the analog-to-digital converter $IC_6$ of FIG. 9, and is input into a computer register that is referenced below as data-N-1-register.

The stepping motor receives a pulse from the motor control computer 10a for the execution of a single step which, for example, leads to the second track of FIG. 5a. The same instruction sequence as for the first track is executed for this second track and the corresponding measured value is deposited into a further computer register with the designation data-N. The two stored, measured values are compared to one another. When the content of the register data-N is smaller than the content of the register data-N-1, then the described sequence is repeated until the content of the register data-N is smaller than the content of the register data-N-1. A status report, i.e. that phase-in in the feed direction has been accomplished, is forwarded to the control computer 13 and the content of the register data-N-1 is transferred into a further register "Start of engraving position". As the location of the maximum of the signals received from the scanner, this counter reading of the stepping motor is the reference value for the axial feed for the following engraving.

Figure 16:
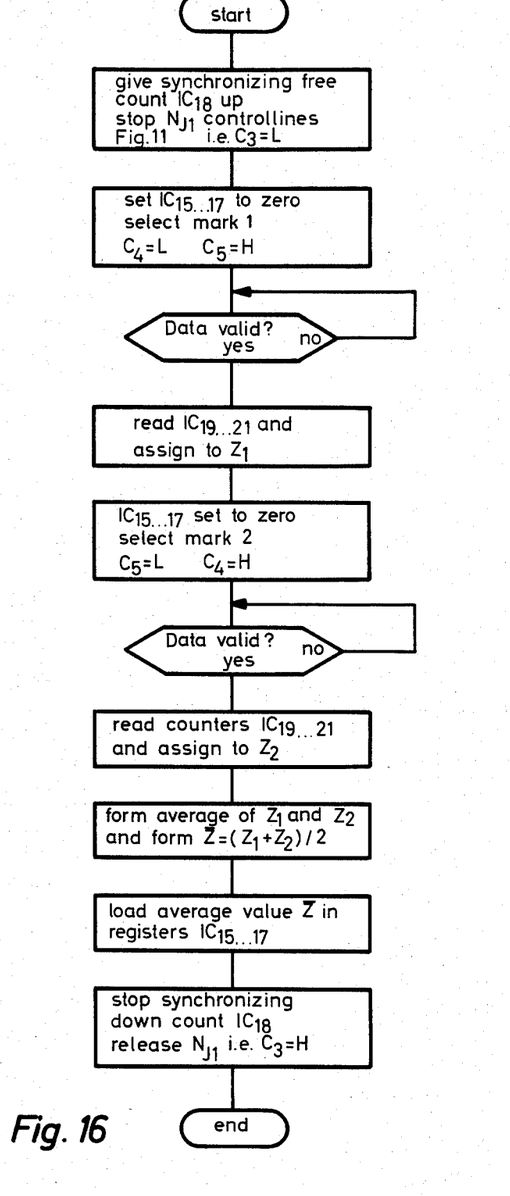
FIG. 16 is a flow chart for a program "circumferential phase-in".

The subprogram "Circumferential phase-in" of the control computer 13 is presented in FIG. 16. This program sequence has already been treated in the description to FIG. 11 and is only specified in successive individual steps here for the sake of a better overview.

The invention is not limited to an engraving of the printing form by means of an electron beam. It can also be applied in other known engraving methods, for example electromechanical or laser engraving, whereby the shape of the engraved cups is essentially identical. It is not necessary to employ the electron beam and a ring diaphragm and a precision resistor as the measuring means, as described in the example of FIG. 1. For example optical measuring installations are also suitable, with corresponding measured signals essentially having the signal progression as illustrated in FIG. 5 being obtainable from the engraved cups. What is important is that a maximum can be perceived within the test tracks or that the first cup after a gap in a cup track can be detected. This can occur via the identification of the cup edge, of the cup center, or both. Optical, capacitive, or inductive telemeters with appropriate resolution are likewise suited, for example, for this purpose.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for topically precise alignment to permit subsequent-engraving of a printing cylinder which was previously engraved, comprising the steps of:
   (a) engraving a series of successively disposed cups or the like to form a cup track on a circumferential line of an as yet unengraved printing form associated with the printing cylinder before actual engraving, said cups serving as reference marks for an axial feed and start of the subsequent-engraving in a circumferential direction;
   (b) after the printing cylinder has been mounted in the engraving machine for subsequent-engraving, placing in rotation the printing cylinder and moving a scanner over the previously engraved cup track axially relative to the printing cylinder;
   (c) identifying a maximum of the signals received from the scanner and retaining a location of the maximum in the cup track as a reference value for the axial feed during the following engraving;
   (d) providing said cup track previously engraved on the circumferential line with at least one defined gap that is free of cups; and
   (e) identifying a first cup following the gap by means of the scanner and evaluating it as a reference location for a start of engraving in the circumferential direction for the following subsequent-engraving.

2. A method according to claim 1 including the steps of employing an electron beam for engraving the printing cylinder; operating the electron beam as a measuring probe for scanning the row of cups disposed on the circumferential line; and providing a diaphragm surrounding the electron beam in insulated fashion in the area of a point of the beam for collecting electrons reflected from the cups.

3. An apparatus for topically precise alignment to permit subsequent-engraving of a printing cylinder which was previously engraved, comprising:
   (a) a scanner;
   (b) means for engraving a series of successively disposed cups or the like to form a cup track on a circumferential line of an as yet unengraved printing form associated with the cylinder before actual engraving, said cups serving as reference marks for an axial feed and start of the subsequent-engraving in a circumferential direction;
   (c) means for placing in rotation the printing cylinder after the printing cylinder has been mounted in the engraving machine for subsequent-engraving, and means for moving the scanner over the previously engraved cup track axially relative to the printing cylinder;
   (d) means for identifying a maximum of the signals received from the scanner and retaining a location of the maximum in the cup track as a reference value for the axial feed during the following engraving;
   (e) said cup track previously engraved on the circumferential line being provided with at least one defined gap that is free of cups; and
   (f) means for identifying a first cup following the gap by means of the scanner and evaluating it as a reference location for a start of engraving in the circumferential direction for the following subsequent-engraving.

4. An apparatus for topically precise subsequent-engraving of a printing cylinder by means of a printing form engraving machine which has a means for generating a stationary reference mark, comprising:
   (a) a measuring installation means for detection of cups successively disposed on a circumferential line in a cup track, said cups being generated by means of the printing form engraving machine, and wherein the cup track exhibits a gap;
   (b) a first evaluation circuit means connected to the measuring installation, said first evaluation circuit means identifying a location of a cup center within the cup track in an axial direction of the printing cylinder and defining a start of the engraving in the axial direction for the subsequent-engraving; and
   (c) a second evaluation circuit means connected to the measuring installation and to the means, for generating the stationary reference mark in order to determine a circumferential offset of a first cup occurring after the gap relative to the stationary mark, and which generates a reference mark that identifies the start of engraving in the circumferential direction.

5. An apparatus according to claim 4 wherein an electron beam engraving means is provided having an electron beam generator means designed as a measuring means for detecting the cup track; and an insulated diaphragm surrounding the electron beam in a proximity of the impingement point of the beam, said diaphragm being connected to a measuring circuit.

6. A method for topically precise alignment to permit subsequent-engraving of a printing cylinder which was previously engraved, comprising the steps of:

(a) engraving a series of successively disposed cups or the like to form a cup track on a circumferential line of an as yet unengraved printing form associated with the printing cylinder before actual engraving, said cups serving as reference marks for axial feed and start of the subsequent-engraving in a circumferential direction;

(b) after the printing form and associated cylinder are mounted in the engraving machine for subsequent-engraving, placing in rotation the printing cylinder and moving an electron beam scanner over the previously engraved cup track axially relative to the printing cylinder;

(c) identifying a maximum of secondary or reflected electrons detected by a detecting means and retaining a location of the maximum in the cup track as a reference value for the axial feed during the following engraving;

(d) providing said cup track previously engraved on the circumferential line with at least one gap that is free of cups; and (e) with respect to the defined gap identifying a cup by means of the scanner and electron detecting means and evaluating it as a reference location for a start of engraving in the circumferential direction for the following subsequent-engraving.

7. The method according to claim 6 wherein the electron beam scanner is also employed for the engraving.

* * * * *